Oct. 25, 1927.

F. F. HILLIX 1,646,962

SEWING MACHINE MOTOR

Filed Jan. 15, 1925

2 Sheets-Sheet 1

Inventor

Foster F. Hillix

By Bates, Macklin, Goldrick & Tea

Attorneys

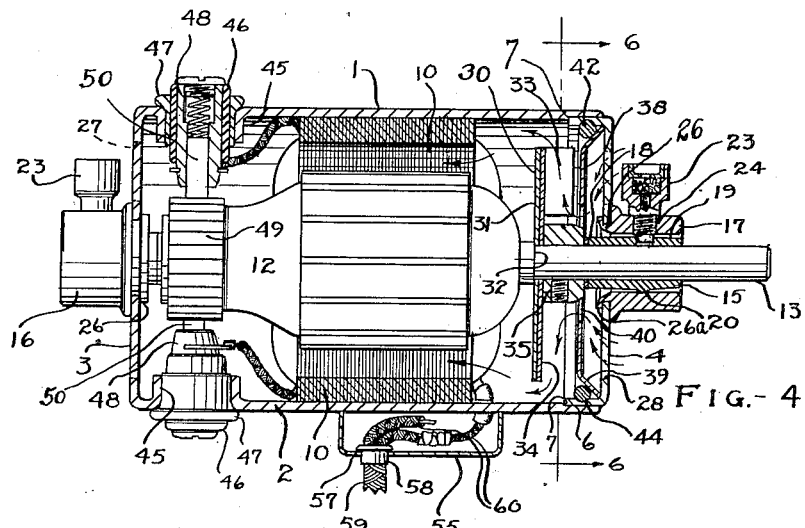

Patented Oct. 25, 1927.

1,646,962

UNITED STATES PATENT OFFICE.

FOSTER F. HILLIX, OF CLEVELAND, OHIO, ASSIGNOR, BY MESNE ASSIGNMENTS, TO WHITE SEWING MACHINE CORPORATION, OF CLEVELAND, OHIO, A CORPORATION OF DELAWARE.

SEWING-MACHINE MOTOR.

Application filed January 15, 1925. Serial No. 2,466.

This invention relates to electric motors and particularly to the class of light motors which may be used to drive sewing machines and the like. This particular embodiment is to be used with standard types of sewing machines and is adapted to be secured to the upright bracket or so called head of the machine in such a position that it may be used to drive the hand wheel through a driving pulley or a friction wheel.

The general object of the invention is to provide an electric motor for a sewing machine, which shall have the desired characteristics of such a motor, which may be easily and cheaply manufactured from a minimum number of parts and which shall be as compact as possible consistent with the desired operating requirements of the motor. Another object is to provide a two part casing for an electric motor each part of which may be drawn from sheet metal, which will receive and support the essential parts of an electric motor in accurate co-relation and thus form the complete motor frame.

Another specific object of my invention is to provide self-aligning bearings for the motor shaft each of which shall have a slight universal movement within journal members at either end of the casing, whereby I may reduce the initial cost of the motor by obviating the necessity of aligning the bearings prior to final assembly.

One of the problems encountered in the manufacture of motors for this purpose is to provide a sufficiently powerful motor within the very restricted space at the side of the sewing machine head to which the motor is secured. The field and armature in most cases could not be made large enough for the required power and provide adequate room for the frame. With the above considerations in mind, I have fitted a thin drawn sheet metal casing tightly around the field stack of punchings and have so mounted the motor that only this single sheet of metal is interposed between the field and the sewing machine head to which the motor is attached. At the same time, the motor field may be so formed that by causing a current of air to be drawn through the casing the field may be uniformly cooled.

Further objects will become apparent in the following description pertaining to the accompanying drawings which illustrate the preferred form of my invention. The essential characteristics are summarized in the claims.

Figure 1:
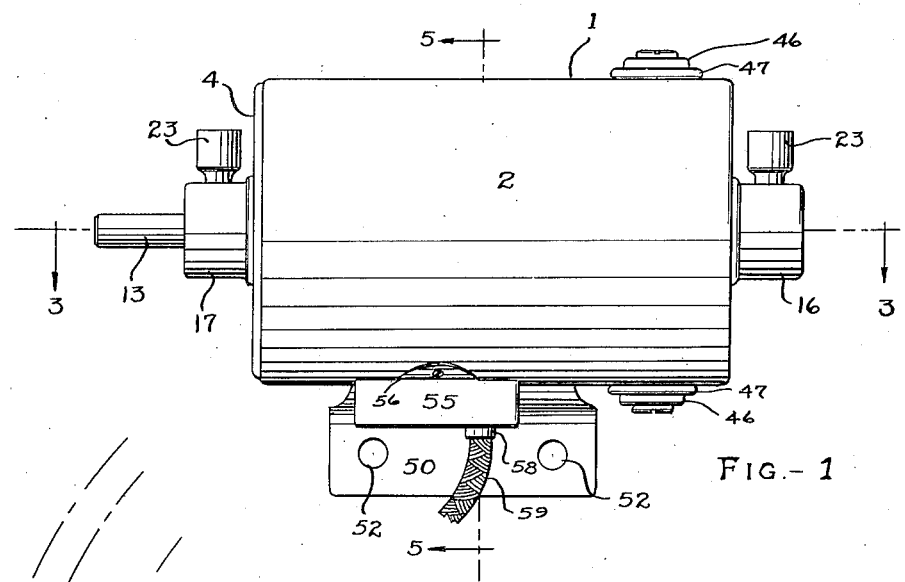
Figure 3:
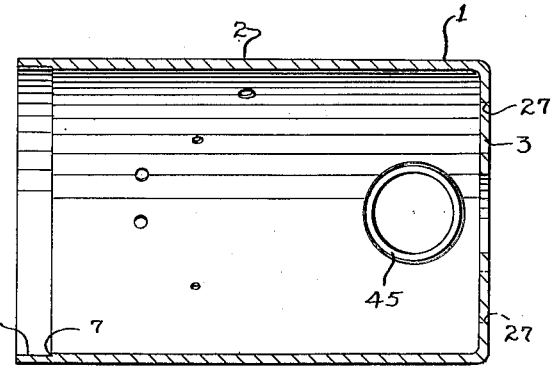
Figure 2:
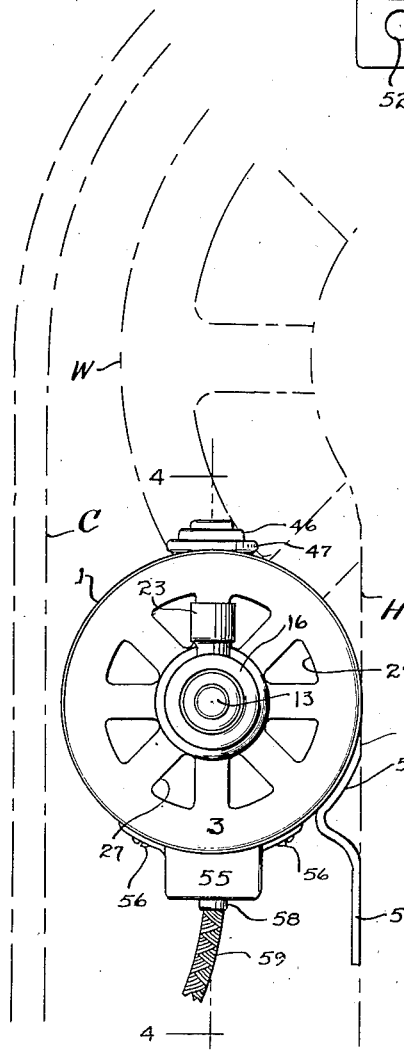

In the drawings, Fig. 1 is a side elevation of my motor; Fig. 2 is an end elevation thereof showing in broken lines the position of certain portions of the sewing machine relative to the motor; Fig. 3 is a longitudinal section through a portion of the motor casing; Fig. 4 is a longitudinal central section through the assembled motor as indicated by the line 4—4 on Fig. 2; Fig. 5 is a transverse section indicated by the line 5—5 on Fig. 1; Fig. 6 is a transverse section indicated by the line 6—6 of Fig. 4; Fig. 7 is a fragmentary cross-section through separated parts of the armature shaft bearing.

Referring to the drawings in detail and designating the various parts by numerals 1 indicates the motor casing in general. As shown, the casing has a thin tubular body portion 2 and end wall portions 3 and 4. In the preferred embodiment the tubular portion is integral with one of the ends or wall portions while the other end portion forms part of a cup which is adapted to be secured in the open end of the member 2. In this form of casing the member 2 has been drawn in several punching operations from light sheet stock and afterwards perforated in various places to receive journal members, a plurality of brushes and to provide ventilator openings.

It is within the spirit of my invention, however, to form the casing in three pieces as well as two, in which case the tubular portion would be made from stock tubing and each of the end portions could be made substantially identical.

I have shown the cup shaped closure member 4 as adapted to be pressed or otherwise secured in the bored or shouldered opening 6 in the main casing and abutting a shoulder 7. Various other methods may be utilized to retain this cup within the casing, such for instance as spinning the brim of the tubular portion 2 slightly down over the radius formed at the base of the cup 4. Ordinarily I find a pressed fit between the members is sufficient to properly position the bearing for centering the armature relative to the field.

The field of the motor is preferably laminated in the usual manner from punchings and may be pressed into the tubular portion of the casing. I have shown the field 10 secured against shifting by small screw 11 extending through the wall 2. The location of this screw is important for the following and other reasons. It must enter the field at a point where the field touches the casing, it must not enter at a point where the metal of the field is thin; it must not produce an unsightly appearance on the exterior of the casing; it must be so located as not to effect the potential balance of the field. Furthermore, it must be so concealed that it does not invite tampering by a householder seeking to adjust the motor. I have found that by placing the screw as shown in Fig. 5 all the objections and requirements are met.
The armature 12 is mounted upon a shaft 13 in bearings 15 that are secured in journal members 16 and 17 at either end of the casing. I have arranged for supporting the bearings in such a manner that they will easily align with the shaft. This is an important point for the reason that a great deal of care and consequent expense in manufacturing is thereby eliminated. To effect this alignment, I have provided conical ends 18 and 19 on each of the bearing members 15 separated by a rounded peripheral ridge 20. The top of the ridge engages the cylindrical inner wall of the journal 16 or 17. The fit between the ridge and journal is just sufficient to prevent vibrations of the armature. I have found that a reasonably tight fit is satisfactory for high speed. An oiler 23 having a threaded portion 24 and a reduced tubular end 25 projects inwardly through the journal so that the reduced portion enters an aperture 22 located centrally of the ridge. The oiler serves both as a lubricating device and at the same time to hold the bearing in place. The journal 17 has a reduced tubular portion 26 which may be peened over as at 26ᵃ to hold the journal in place.

I arrange for ventilating or cooling the motor by providing sector like openings 27 and 28 in both ends of the casing as shown in Figs. 2 and 4. In one end preferably that opposite the commutator and brushes of the motor, I provide a centrifugal fan 30 having a substantially circular plate 31 abutting a shoulder 32 on the shaft and carrying blades 33. The blades as shown in Fig. 6, have a tangential arrangement about a circle concentric to the shaft; in other words, the blades are parallel to and offset from true radii. The blades may be best formed by partially severing portions of a second plate 34, disposed adjacent the plate 31, at right angles to the body thereof as shown in Fig. 4. The assembled fan may be attached in any manner as by welding to a cylindrical member 35 which may be rigidly secured to the shaft.

Air entering the openings 28 is deflected inwardly toward the shaft by a circular baffle plate 38 having a dished outer periphery 39. The edge of the dish bears against the transverse wall of the member 4 and the plate is held in place by a resilient ring 42 separated as shown in Fig. 6 and which bears within an inner peripheral groove 44 in the flange of the cupped member 5. The plate has an opening 40 somewhat larger than the shaft which admits the air from the openings 28 to the fan at the base of the blades. The air currents are drawn inwardly by the fan as shown by the arrows in Fig. 4, first toward the shaft and the bearing 15, then outwardly to the shell of the motor and then rearwardly between the armature field through the openings 62 (Fig. 5) between the field windings and through the openings formed by the cutaway sides of the field indicated at 63. The air leaves the motor through the openings 27 in the other end of the frame.

Inwardly punched tubular portions 45 are provided in the casing for supporting the motor brushes in diametrically disposed vertical position as shown. So placed, the brush holders are in the most advantageous position relative to the terminal wires leading from the motor field windings and also the laterally projecting portions of the holders occupy only idle space, whereas in any other position either the symmetry of the casing would be destroyed, or in the case of a horizontal disposition the brushes could not be adjusted. Into these are pressed metal sleeves 46. The sleeves 46 contain brush units comprising an insulating collar which embraces a tubular member 48 shown as recessed at 40 to loosely embrace inwardly extending spring pressed brushes. However, I do not propose to limit the use of my invention with this type of brush holder.

To attach the motor to a sewing machine, I have shown a bracket 50 which may be spot-welded to the side of the casing and have an outwardly curved and downwardly extending bracket member 51. This latter portion may be perforated as at 52 to receive screws or other attaching members to secure it to the sewing machine head. In order to provide for as large a contacting surface between the casing and bracket and yet hold the length of the unattached portion to that found most desirable, I bevel the upper edge of the bracket at 64 so that the beveled edge is horizontally tangential to the outer surface of the casing at the point where the casing rests against the sewing machine head. With reference to Fig. 2 wherein I have shown the motor attached to a sewing machine head H in correct driving relation to the hand wheel W, it will be noted that the beveled surface is substantially in the same plane as the contacting side at the attaching portion 51. The arrangement is such that the bracket engages the motor over a sufficiently large area to effectively support it without being interposed between the casing and head of the machine. The connecting portion between that attached to the motor and that secured to the frame is short enough to insure the desired rigid support of the motor.

Fig. 2 also shows the relative location of the motor to the usual cover C which is ordinarily made only large enough to clear the hand wheel by about the distance shown. In case of a drop head machine the horizontal hinged cover usually clears the machine head and wheel by about the same amount.

I prefer to provide an entrance box 55 for the conductor wires to the motor, which may be secured to the casing as shown in Figs. 1 and 5 by means of screws 56. The box is apertured at 57 for receiving a metal clip 58 adapted to be crimped over the terminus of an insulating jacket 59 for the conductor wires 60. The entrance box by reason of its position does not present an undesirable appearance that would be likely to detract from the general symmetry of the motor. Moreover, the box is so placed centrally of the motor frame and directly therebeneath that the attaching flanges may be of a sufficient size yet which will not encroach upon the surface required by the motor attaching bracket.

It will be seen that I have provided a sewing machine motor and casing which may be easily assembled from a minimum number of parts and which is designed to operate in an extremely efficient manner. The casing itself is held together without the use of screws or rivets. The construction is such that the required clearance may be maintained between the motor armature and field as well as the correct diametrical alignment of the motor brushes to insure their proper contact with the commutator without necessitating costly precision methods of manufacturing.

I claim:

1. A sewing machine motor having a laminated field core, an armature and a shaft therefor, a tubular cup-shape sheet metal casing having one end portion integral therewith and closely embracing said field core laminations and extending substantially the full length of the motor, a closure member comprising the other end portion, bearings supported by said end portion, inwardly extending tubular flanges drawn from said cup-shaped casing near the said integral end portion thereof for supporting motor brushes, both of the said end portions being perforated for ventilating the motor, whereby the sheet metal casing and separable end portion form both the frame and housing for the motor.

2. In a motor the combination of a casing, a closure member therefor having an inner peripheral groove therein, a series of ventilator openings in the closure member, a disc within the closure member and spaced apart from said ventilator openings, resilient means seated in said groove for locking the disc in place, a bearing carried by said closure member, an armature shaft carried by the bearing and a centrifugal fan mounted on the shaft adjacent said disc for cooling the motor whereby air is first drawn into the motor through the openings deflected toward the shaft by the disc and then forced outwardly and through the casing of the motor.

3. In a sewing machine motor, a cup-shaped metal casing of sheet metal provided at its end with a central opening, a closure member for the casing having a central opening, hollow journal members secured within the central openings, each having an annular shoulder and an outwardly peened flange adapted to engage the inner and outer sides of the periphery of one of the openings, bearing members within said journal members having a peripheral ridge lightly engaging the interior of said journal members and lubricator means having a portion thereof extending through the wall of said journal member for holding the bearing member in place.

4. In a sewing machine motor a light sheet metal casing provided at its ends with a series of ventilator openings and a central opening, journal members secured within the central openings, and clamping both sides of the material forming the casing adjacent the periphery of the openings, bearing members pivotally mounted within said journal members and a motor armature shaft supported by said bearing members.

5. In a motor having an armature and shaft therefor the combination of a housing having axially disposed openings therein, journal members comprising hollow sleeves each disposed in said openings, bearing members for supporting an armature shaft having a continuous ridge formed on the outer surface thereof and each in engagement with the interior of a sleeve, an opening in the sleeve, an opening adjacent thereto in said bearing member and a lubricating member secured in said opening in the sleeve and loosely fitting the opening in said bearings whereby the axis of said bearing may be swung relative to the sleeve.

6. A motor having a field core, an armature and a shaft therefor, a housing surrounding the field core and armature, journal members carried thereby at the ends thereof, bearing members carried by the journal members and having an enlarged central peripherally disposed ridge thereon and a member extending from the wall of the journal into said bearing member at a point of contact with the ridge for preventing the removal thereof from the journal member and for allowing a slight lateral movement of the bearing member.

7. In an electric motor, a cylindrical casing member adapted to be made from sheet metal, a motor field structure closely fitting the inner cylindrical surface of the casing, a bracket secured to the exterior of the casing having an outwardly and downwardly curving leg portion adapted to engage the head of a sewing machine and superimposed openings in the attaching bracket and said casing and means extending through the openings into the field structure for holding the field structure in place.

In testimony whereof, I hereunto affix my signature.

FOSTER F. HILLIX.